United States Patent [19]

Grimm

[11] 4,197,330

[45] Apr. 8, 1980

[54] PROCESS FOR THE PRODUCTION OF PILLED, GRANULATED, ENCRUSTED SEED MATERIAL

[75] Inventor: Hans Grimm, Meinhard, Fed. Rep. of Germany

[73] Assignee: Saat- und Erntetechnik GmbH, Eschwege, Fed. Rep. of Germany

[21] Appl. No.: 878,013

[22] Filed: Feb. 15, 1978

[30] Foreign Application Priority Data

Dec. 30, 1977 [DE] Fed. Rep. of Germany ....... 2758949

[51] Int. Cl.² ............................................... A01C 1/06
[52] U.S. Cl. ........................................ 427/4; 47/57.6; 427/212
[58] Field of Search ...................... 427/4, 212; 47/57.6

[56] References Cited

U.S. PATENT DOCUMENTS

| 122,757 | 6/1872 | Claussen | 427/4 X |
|---|---|---|---|
| 2,168,523 | 8/1939 | Heyl | 427/4 X |
| 2,502,809 | 4/1950 | Vogelsang | 47/57.6 X |
| 3,284,209 | 11/1966 | Kelley | 47/57.6 X |
| 3,621,612 | 11/1971 | Porter | 47/57.6 X |
| 3,703,404 | 11/1972 | Kirk | 47/57.6 X |
| 3,905,152 | 9/1975 | Loperfido | 47/57.6 |
| 3,991,517 | 11/1976 | Lewis | 47/57.6 |

*Primary Examiner*—Shrive P. Beck
*Attorney, Agent, or Firm*—Scully, Scott, Murphy & Presser

[57] ABSTRACT

Pilled, granulated, encrusted seed material is provided by a process in which the seeds to be processed are divided into two or more fractions according to size, configuration, specific gravity, and the like. Each seed fraction is thereafter separately coated for optimum physiological properties and the fractions are admixed and dried.

5 Claims, No Drawings

PROCESS FOR THE PRODUCTION OF PILLED, GRANULATED, ENCRUSTED SEED MATERIAL

It is known to treat seed material with an enveloping mass without dividing these into different fractions prior to treatment. Through this operation there is produced a treated seed material in which the different parameters such as grain size, grain shape, specific gravity, surface condition, are not considered. This manner of operation has the disadvantage that, in order to attain a predetermined pill caliber or predetermined granulate grain size, small or low density seeds must be coated with a thicker enveloping coating material layer than large seed grains. A thicker enveloping mass coating is, however, hindering to a high germination speed. This is the case when the composition of the enveloping mass does not have the required water capacity and the required pore volume in conformance with the coating thickness of the enveloping mass. Pursuant to the state of the art, in the pilling of a mixture of large and small, or round and flat seeds, a matching of the pore volume to the fractions of the seed material is not possible.

It is also not possible in the state of the art to undertake a matching of the germination-physiological properties of the seed-grain fractions in the seed material to different grain sizes, grain form, specific gravity, surface conditions by qualitative and quantitative measurements of the enveloping masses.

Pursuant to the known operation, the composition of the enveloping material is related only to the type of seed and particularly not to the individual fractions of a type of seed. A process has now been found for the pilling, granulating, encrustation of seed material by utilization of inorganic and/or organic solid and liquid materials which solves the problem of fitting the enveloping mass to the specific properties of the fractions of the seed material after division of this into distinguishable parameters.

Included in these parameters are the grain size, grain form, the specific gravity, and the surface conditions. However, other parameters are also suited for the division of the seed material into fractions.

The process pursuant to the invention allows for an optimum matching of the distinguishable properties of the enveloping mass to the properties of fractions of the seed material. The process of the invention is defined in the patent claims.

Under the term "fractions" there are to be understood pursuant to the process of the invention portions of seed material charges which are produced by division according to grain sizes, grain forms, specific gravities, and distinguishable surface conditions.

The "grain size" of the seed material is determined by the diameter in millimeters.

The "grain form" of the seed material is determined by the deviation from the spherical shape by determination of a second diameter. Such grain forms are flat, or peaked or grain forms which deviate from the spherical shape in other ways.

Under "specific gravity" is to be understood the weight of the seed volume in $g/cm^2$.

Under the term "surface condition" is to be understood the distinguishable form of the seed surface, which can be smooth, grooved, ridged, roughened.

There are also other differences known in the surface of the seed grain which are included in the process pursuant to the invention.

The "germination conditions" for the seed material which is treated pursuant to the process of the invention are essentially dependent upon the water availability, the density of the prevailing germination substrate, the air supply, and the temperature during the germination process.

Under the term "germination physiological properties" there are to be understood in particular the reactions of the seed material to the germination conditions, which become apparent in a higher or lower germination speed or germination ability.

Under the term "long-fibered materials" there are to be understood those of 0.5 to 1.0 mm average length and under "short fibrous materials" those of below 0.5 mm in average length, whereby the majority consist of over 70% by weight at these measurements.

Under the term "porosity" there is to be understood the relationship of the air-permeable interstices between and within the solid material particles of the enveloping masses.

Under the term "lower water capacity" of the enveloping material there is to be understood a water absorption capacity of about 300 g water for each kg for the enveloping mass applied to the seed material.

Under the materials with "higher adhesion force" there are to be understood those which, because of their material properties, adhere to smooth surfaces. Such materials are fine-grained bentonite, kaolin, vermiculite. To be understood as materials with "lower adhesion force" are the same materials with a coarser structure above 0.1 mm.

German Pat. No. 919,328 renders known an envelopment for seed grains which consists of a finely divided sub-bentonite. This material should conglomerate the seed grain by the treatment and solidify by its own capability for adhering. Small spheres should be produced through this treatment which carry a plurality of the seed grains. It is an object of this process to produce coated seed grains which are essentially of uniform size, form and type, in order to be able to easily handle the seeds.

German Pat. No. 921,291 discloses a process for the encrustation of seed material. There is to be produced a cover coating which contains a water-soluble binding medium and a porous, strongly absorptive substance.

For the dusting of the seeds an aqueous solution of a water-soluble plastic material such as methylcellulose solution should be utilized. As a finely divided solid material there should be used, for example, feldspar. German Pat. No. 960,241 relates to the envelopment of seed grains. A binding medium which can be water-removable and which can also be applied with inert filler materials in one or more layers should be utilized. This state of the art is also brought forth in a same manner in other publications. These proposals utilize the seed material without a division into fractions with distinguishable properties. This teaching has not developed itself further. This teaching does not therefore approach the process pursuant to the invention.

Only pursuant to the new teaching of the division of the seeds into fractions which allows the treatment with differentiating enveloping materials, can, for the first time, the significant advantages of the process pursuant to the invention be attained. Thereby it is not necessary to utilize other materials than those in the state of the art. However, it is essential that these enveloping materials be different for the individual fractions, as can be ascertained from the exemplary embodiments.

Preferably suited as hygroscopic materials pursuant to the process of the invention are: MgCl$_2$, CaCl$_2$, glycerine.

As hydrophilic materials pursuant to the process there are preferably suited: bentonite, vermiculite, methylcellulose, phosphate starch.

The process pursuant to the invention is preferably utilized for seed material of: sugar, feed, beet, vegetable, and various flower seeds. The adjustment of the "graduated water capacity" is effected through the selection of materials, in different quantities, which will store or absorb differentiable quantities of water. Preferred materials are water-removable bentonite and vermiculite. Preferred, not water-removable materials are powdered rock.

The process pursuant to the invention is described by means of the following exemplary embodiments. However it is not limited to these examples.

The process pursuant to the invention is, moreover, described by an example in which enveloped seed pursuant to the state of the art is compared with enveloped seed pursuant to the process of the invention and thereby will prove the technical advance.

The process pursuant to the invention affords the possibility that by selection of the suitable parameters, it can be applied to each type of seed, and pursuant to this there can be undertaken the division into fractions.

EXAMPLE 1

100 kg
  sugarbeet seed material having a grain size of circular-apertured sieve 3.0 to 4.5 mm were divided by sieving into two fractions of different grain sizes:
Fraction I
  44 kg of a grain size 3.0 to 3.75 mm
Fraction II
  56 kg of a grain size 3.75 to 4.25 mm
Fraction I
  is moistened in a known Dragier apparatus, and thereafter dusted with an enveloping material of high porosity, and this step repeated until a predetermined pill size has been reached.

The enveloping material of high porosity is composed as follows:
  90 parts by volume long fibered wood flour
  8 parts of volume course-grained quartz
  2 parts by volume methylcellulose
Fraction II
  is treated in the same manner.

The enveloping material of lower porosity is composed as follows:
  75 parts by volume short fibered peat powder
  10 parts by volume fine-grained bentonite
  8 parts by volume fine-grained kaolin
  4 parts by volume fine-grained vermiculite
  3 parts by volume methylcellulose After completion of these treatments, the pilled seed materials of Fraction I and Fraction II are admixed in the original proportions and dried.

EXAMPLE 2

100 kg
  feed beet seed material with seed grains of different specific gravity are divided by gravity into two fractions with lower and higher specific gravity:
Fraction I
  38 kg with a lower specific gravity
Fraction II
  62 kg with higher specific gravity
Fraction I
  is moistened in a known Dragier apparatus and thereafter dusted with an enveloping mass of lower water absorption capacity, and this measure repeated until a predetermined pill size is attained.

The encompassing material of lower water absorption capacity is composed as follows:
  60 parts by volume long fibered wood flour
  36 parts by volume long fibered peat flour
  4 parts by volume methylcellulose
Fraction II
  is treated in the same manner.

The enveloping material of higher water absorption capacity is composed as follows:
  45 parts by volume short fibered wood flour
  20 parts by volume short fibered peat flour
  9 parts by volume short fibered bentonite
  6 parts by volume short fibered vermiculite
  10 parts by volume short fibered quartz
  4 parts by volume phosphate starch
  6 parts by volume methylcellulose After completion of these treatments the pilled seed materials of Fraction I and Fraction II are admixed in the original proportions and dried.

EXAMPLE 3

100 kg
  sugarbeet seed material having a round-apertured-sieved grain size of 2.75 to 4.25 are divided by sieving into two fractions of different grain size:
Fraction I
  47 kg having a grain size of 2.75 to 3.5 mm
Fraction II
  53 kg having a grain size of 3.5 to 4.25 mm
Fraction I
  is moistened in a known Dragier apparatus, thereafter dusted with an enveloping mass which contains a small addition of hydrophilic and hygroscopic materials, and this step is repeated until a predetermined pill size is reached.

The enveloping mass with a smaller addition of hydrophilic and hygroscopic materials is composed as follows:
  75 parts by volume long fibered wood powder
  15 parts by volume fine-grained limestone powder
  5 parts by volume fine-grained bentonite
  1 part by volume calcium chloride
  1 part by volume glycerine
  3 parts by volume methylcellulose
Fraction II
  is treated in the same manner.

The enveloping mass with a higher addition of hydrophilic and hygroscopic materials is composed as follows:
  35 parts by volume long fibered wood powder
  30 parts by volume fine-grained limestone powder
  10 parts by volume fine-grained bentonite
  8 parts by volume fine-grained kaolin
  7 parts by volume fine-grained vermiculite
  4 parts by volume glycerine
  3 parts by volume calcium chloride
  5 parts by volume methylcellulose After completion of these treatments the pilled seed materials of Fraction I and Fraction II are admixed in the original proportions and dried.

EXAMPLE 4

100 kg
sugarbeet seed material having a round-apertured sieve grain size of 2.75 to 4.25 mm are sieved into two fractions of different grain sizes.

Fraction I
52 kg having a grain size of 2.75 to 3.75 mm

Fraction II
48 kg having a grain size of 3.75 to 4.25 mm

Fraction I
is moistened in a known Dragier apparatus and thereafter dusted with an enveloping mass, and these steps alternatedly repeated, until an enveloping mass quantity of 150 kg has been utilized.

The enveloping mass can correspond to the composition of Examples 1 through 3, however, possesses a smaller amount of soil insecticide bendiocarb of 0.35%.

Fraction II
is treated in the same manner until 50 kg of an enveloping material has been utilized. The enveloping mass corresponds to Examples 1 through 3, however, possesses a larger content of soil insecticide bendiocarb of 0.6%.

After completion of these treatments the pilled seed materials of Fraction I and Fraction II are admixed in the original proportions, and dried.

EXAMPLE 5

Comparison of the germination speed and the germination capability of pilled sugarbeet seed material according to Example 3 with pilled seed material pursuant to the state of the art.

The investigations were carried out on a loess loam bed having a moisture of about 40% of the water absorption capacity and a moisture of about 75% of the water absorption capacity. Soil temperatures 15°–20° C.; seed depth 2 cm.

| | Germination % | | | |
|---|---|---|---|---|
| | Pilled seed material pursuant to Example 3 | | Pilled seed material pursuant to the state of the art | |
| Days | Water Capacity about 40% | Water Capacity about 75% | Water Capacity about 40% | Water Capacity about 75% |
| 5 | 0 | 8 | 0 | 0 |
| 6 | 4 | 24 | 0 | 1 |
| 8 | 27 | 42 | 7 | 18 |
| 10 | 52 | 71 | 34 | 44 |
| 12 | 61 | 74 | 48 | 57 |
| 14 | 73 | 74 | 62 | 66 |
| 16 | 76 | 75 | 68 | 69 |
| 18 | 76 | 75 | 72 | 69 |

The results—particularly on the 6th to the 10th day—indicate the higher germination speed of the pilled seed material pursuant to the process of the invention. Already after 12 days almost the final germination capacity has been reached. By contrast therewith, the seeds pursuant to the state of the art showed a lower germination speed and reached the final value only after 16 days. The final germination capacity is lower for the seed material pursuant to the state of the art and does not reach the value for the seed material pursuant to the invention.

The process of the invention offers significant biological advantages for the seed material which has been treated in fractions and then admixed and dried. These lie in an increased scope of adaptability to different germination conditions.

The seed material which has been treated with a uniform enveloping mass pursuant to the state of the art is contrastingly, suited only for predetermined restricted germination conditions.

If these conditions for which the treatment with an enveloping material of predetermined composition is followed do not occur, reduced germination speeds and germination capability for the seed material will result.

These disadvantages are avoided in the seed material produced pursuant to the process of the invention. This offers the significant advantage that the seed material which is divided into fractions and treated with enveloping materials having different compositions and properties, after admixing and drying, is adapted to distinguishable prevailing biological conditions.

The process of the invention also offers technological advantages. The division of the seed material into fractions pursuant to distinguishable parameters represents an additional process step. Nevertheless, a more rapid operation in the treatment of the individual fractions is attained by a larger throughput capacity. This is due to the increased homogeneity of each fraction.

Also, the economics of the process of the invention are improved in that the utilization of enveloping materials having different compositions which are correlated to the fractions, results in a lower loss.

I claim:

1. Process for the production of pilled, granulated, encrusted seed material, which improvement comprises dividing untreated seeds to be enveloped into two or more fractions, each fraction having different parameters, separately moistening the seeds constituting each fraction with at least one enveloping material selected from the group consisting of solid inorganic, liquid inorganic, solid organic and liquid organic material, admixing each of the seed fractions following the enveloping of the seeds therein and drying the seeds as admixed, said parameter being selected from the group consisting of grain size, grain form or the specific weight, wherein the fraction with small grain size or flat grain form, or low specific gravity is treated with an enveloping mass to achieve higher porosity and the fractions of larger grain sizes, or rounder grain form or of higher specific gravities are treated with an enveloping mass to achieve lower porosities.

2. Process according to claim 1, characterized in that the fraction of small grain size or flat grain form or the low specific gravity is treated with an enveloping mass with low water capacity and the fractions of larger grain sizes or rounder grain form or of higher specific gravity with an enveloping mass with graduated, larger water capacity.

3. Process according to claim 1, characterized in that by the utilization of the surface condition as the parameter, the fraction with smoother surface is treated with an enveloping mass of fine-grained materials with higher adhesion force and the fractions with rougher or with wrinkled surfaces with an enveloping mass of graduated, course-grained materials of lower adhesion force.

4. Process according to claim 1, characterized in that the fraction of small grain size or flat grain form or lower specific gravity is treated with an enveloping mass which contains a higher addition of hydrophobic materials and the fractions of larger grain sizes or rounder grain forms or higher specific gravity with an enveloping mass, containing a graduated lower addition of hydrophobic materials.

5. Process according to claim 1, characterized in that the fraction of small grain size or flat grain form or low specific gravity is treated with an enveloping mass containing a lower addition of at least one material selected from the group consisting of hydrophilic and hygroscopic material and fractions of larger grain sizes or rounder grain form or of higher specific gravity are treated with an enveloping mass containing a higher addition of at least one material selected from the group consisting of hydrophilic and hygroscopic material.

* * * * *